(12) United States Patent
Eswarappa

(10) Patent No.: US 6,761,169 B2
(45) Date of Patent: Jul. 13, 2004

(54) BI/MULTI-DIRECTIONAL FILTER CARTRIDGE AND FILTER PLATFORM FOR MOUNTING THE CARTRIDGE THEREON

(75) Inventor: Muniyapla Eswarappa, Andover, MA (US)

(73) Assignee: Vase Technology, Lawrence, MA (US)

(*) Notice: Subject to any disclaimer, the term of this patent is extended or adjusted under 35 U.S.C. 154(b) by 219 days.

(21) Appl. No.: 09/930,953

(22) Filed: Aug. 17, 2001

(65) Prior Publication Data

US 2002/0026942 A1 Mar. 7, 2002

Related U.S. Application Data

(60) Provisional application No. 60/225,746, filed on Aug. 17, 2000.

(51) Int. Cl.[7] ............................................. A62B 23/02
(52) U.S. Cl. ............................. 128/205.27; 128/206.17
(58) Field of Search ..................... 128/205.27, 205.28, 128/205.29, 206.12–206.19, 206.21, 206.29, 207.11, 201.22, 201.23, 201.25, 202.22; 55/486, 487, 482, 484, 490, 497, 505–507, DIG. 33, DIG. 35

(56) References Cited

U.S. PATENT DOCUMENTS

| | | | |
|---|---|---|---|
| 2,055,853 A | 9/1936 | Schwartz | 183/45 |
| 2,062,834 A | 12/1936 | Schwartz | 183/44 |
| 2,065,775 A | 12/1936 | Wahlert | 183/44 |
| 2,337,232 A * | 12/1943 | Daly | 96/132 |
| 2,744,525 A | 5/1956 | Whipple | 128/146 |
| 2,952,342 A * | 9/1960 | Schnittker | 52/658 |
| 3,072,119 A | 1/1963 | Matheson | 128/146 |
| 3,161,491 A * | 12/1964 | Gongoll et al. | 96/416 |
| 4,088,461 A * | 5/1978 | Brauer | 96/147 |
| 4,256,474 A * | 3/1981 | Berger et al. | 96/152 |
| 4,487,606 A * | 12/1984 | Leviton et al. | 604/319 |
| 4,543,112 A * | 9/1985 | Ackley et al. | 96/137 |
| 4,549,543 A * | 10/1985 | Moon | 128/206.12 |
| 4,771,771 A * | 9/1988 | Walther | 128/201.25 |
| 4,850,346 A * | 7/1989 | Michel et al. | 128/206.15 |
| 4,873,970 A * | 10/1989 | Freidank et al. | 128/202.22 |
| 4,886,058 A | 12/1989 | Brostrum et al. | 128/206.12 |
| 4,915,105 A * | 4/1990 | Lee | 128/205.27 |

(List continued on next page.)

FOREIGN PATENT DOCUMENTS

| | | |
|---|---|---|
| FR | 747042 | 6/1933 |
| FR | 2 713 939 | 6/1995 |

Primary Examiner—Aaron J. Lewis
Assistant Examiner—Teena Mitchell
(74) Attorney, Agent, or Firm—Fitzpatrick, Cella, Harper & Scinto

(57) ABSTRACT

A bi/multi-directional air flow filter cartridge includes a filter pad and a filter pad base. The filter pad includes: outer filter walls made of a filter material suitable for filtering at least particulates, the walls being spaced apart to define an inner area therebetween, and to allow air to pass into the inner area from two or more directions; and a gas/vapor adsorber/absorber member, located within the inner area defined by the outer filter walls, the filter walls maintaining a spacing between inner surfaces of the walls and the gas/vapor adsorber/absorber member, wherein the gas/vapor adsorber/absorber member includes an adsorber/absorber upstream portion of its outer surface structured to, in response to a source of suction, receive air that has already been filtered by the filter walls, such that the air passes through at least a minimum length of the gas/vapor adsorber/absorber member and then out of an opening in the filter pad at a downstream portion of the gas/vapor adsorber/absorber member. The filter pad base is attached to the filter pad and includes a connection member located in association with the filter pad opening. The base removably connects the filter unit to a source of suction.

11 Claims, 18 Drawing Sheets

U.S. PATENT DOCUMENTS

| | | | |
|---|---|---|---|
| 4,921,512 A | * 5/1990 | Maryyanek et al. | 55/488 |
| 5,038,775 A | * 8/1991 | Maruscak et al. | 128/205.27 |
| 5,052,385 A | * 10/1991 | Sundstrom | 128/205.27 |
| 5,090,407 A | * 2/1992 | Lesage et al. | 128/205.27 |
| 5,226,412 A | * 7/1993 | Winters | 128/206.12 |
| 5,302,354 A | * 4/1994 | Watvedt et al. | 422/177 |
| 5,320,096 A | * 6/1994 | Hans | 128/205.29 |
| 5,463,693 A | * 10/1995 | Birli et al. | 381/75 |
| 5,478,377 A | * 12/1995 | Scavnicky et al. | 96/17 |
| 5,562,092 A | * 10/1996 | George | 128/201.25 |
| 5,592,933 A | * 1/1997 | Zucchi | 128/201.13 |
| 5,619,989 A | * 4/1997 | Kruger | 128/206.17 |
| 5,666,949 A | * 9/1997 | Debe et al. | 128/202.22 |
| 5,766,287 A | * 6/1998 | Flaherty et al. | 55/482 |
| 5,782,235 A | 7/1998 | Müller et al. | 128/206.15 |
| 5,964,221 A | * 10/1999 | McKenna | 128/205.12 |
| 6,044,842 A | * 4/2000 | Pereira et al. | 128/202.27 |
| 6,123,076 A | * 9/2000 | Roberts et al. | 128/205.29 |
| 6,146,436 A | * 11/2000 | Hollingsworth et al. | 55/486 |
| 6,146,449 A | * 11/2000 | Lee et al. | 96/117.5 |
| 6,345,620 B2 | * 2/2002 | Salapow et al. | 128/206.17 |
| 6,363,934 B2 | * 4/2002 | Metzger | 128/206.16 |
| 6,382,206 B1 | * 5/2002 | Palazzotto et al. | 128/201.19 |
| 6,435,184 B1 | * 8/2002 | Ho | 128/206.21 |
| 6,467,481 B1 | * 10/2002 | Eswarappa | 128/206.17 |
| 6,468,320 B1 | * 10/2002 | Sumitani et al. | 55/320 |
| 6,575,165 B1 | * 6/2003 | Cook et al. | 128/206.17 |
| 2002/0017085 A1 | * 2/2002 | Eswarappa | 55/482 |

* cited by examiner

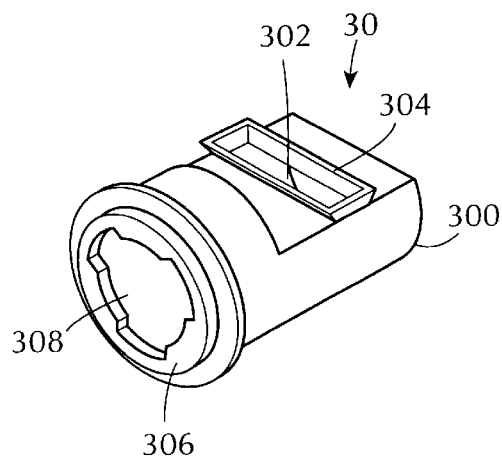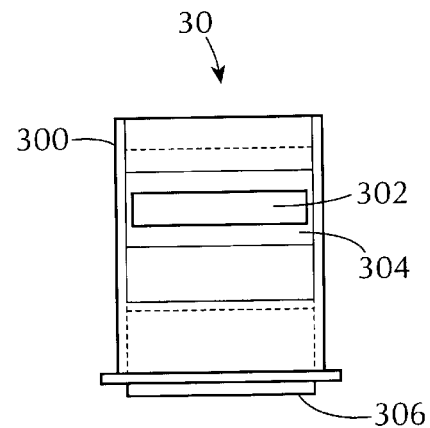
FIG. 3A  FIG. 3B
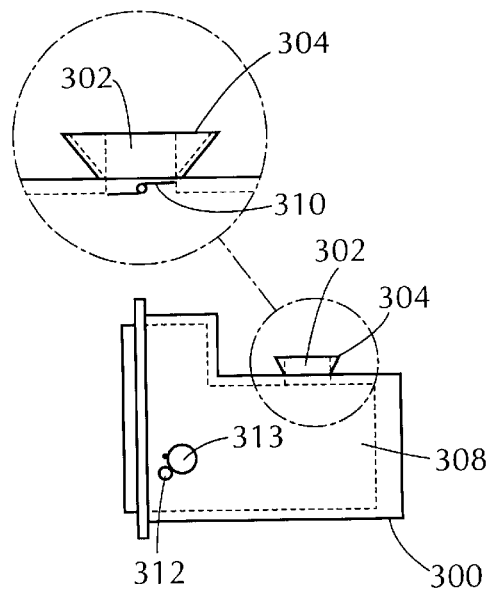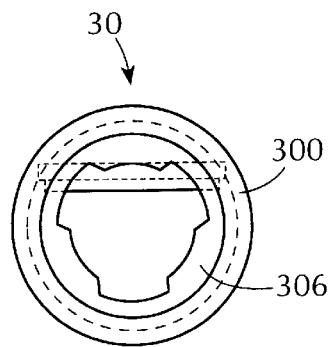
FIG. 3C  FIG. 3D

BI/MULTI-DIRECTIONAL FILTER CARTRIDGE AND FILTER PLATFORM FOR MOUNTING THE CARTRIDGE THEREON

CROSS-REFERENCE TO RELATED APPLICATION

This application claims benefit of U.S. Provisional Application No. 60/225,746, filed Aug. 17, 2000, which is hereby incorporated by reference.

BACKGROUND OF THE INVENTION

1. Field of the Invention

The present invention relates generally to the field of air filter devices. More particularly, filter devices structured for coupling with a breathing apparatus, such as a respirator or mask or other source of suction, and so as to provide the ability to couple one or more filter elements to a filter platform connected to the breathing apparatus, such that the filter elements and platform function together as an integrated filtering device. More particularly the present invention relates to filter cartridges of the type operable to filter out both particulate matter and to absorb and/or adsorb gases, odors and vapors.

2. Description of the Related Art

When a person is subject to adverse breathing conditions, such as in an environment contaminated with airborne particles and/or harmful vapors, that person's safety and health will require some type of device for filtering the air before it passes into his or her lungs. To achieve this goal, requirements for such filtering devices have been codified (42 C.F.R. § 84) by the National Institute of Occupational Safety and Health (NIOSH). NIOSH regulations were revised to be made substantially more stringent (in June 1995, with a grandfather clause for three years, effective June 1998), to require that these filtering devices demonstrate increased efficiency, a measure of its ability to remove contaminants from air as it is drawn (breathed) through the filtering device.

Historically, improvements in the efficiency of a filtering device have resulted in a concomitant increase in the difference in air pressure between the environment and the interior of the filtering device required for drawing air through it at a given rate. This pressure differential is commonly referred to as pressure drop of the filtering device. Further, increased efficiency in a filtering device also typically has led to a reduction in the effective life span of the filtering device. Consequently, with prior art filtering devices, greater safety through improved filter efficiency has typically made such devices difficult to breathe through and of extremely limited life span. As a result, in addition to breathing discomforts, users experience frequent periods of down time as they must either leave the work area and/or stop working to remove and replace filtering devices.

Accordingly, it has long been a goal of those in the field of filtering devices to develop a filtering device that meets the natural and codified safety requirements of users while demonstrating a pressure drop that is sufficiently low to allow comfortable breathing by the user and, even more importantly, while functioning effectively for a greater period of time.

To attain such improvements, inventors have manipulated the shapes and sizes of the air filters to maximize surface area in the hope that, with increased area over which filtering can be conducted, acceptable efficiency can be realized while at the same time affording the user a low pressure drop and, thus, comfortable breathing. However, filters can be made only so large before they begin to interfere with a user's vision or mobility. Inventors have also experimented with improved materials in attempted furtherance of the same goals. To date, even slight improvements in efficiency, pressure drop, or life span have been hailed as marked improvements in the art.

One attempt to increase the surface area of the filter is illustrated in U.S. Pat. No. 2,130,555 to Malcolm. The Malcolm patent shows a dust filter unit of a generally tubular form, but having within the unit a filter having a plurality of bellows-like folds. The bellows-like folds provide increased surface area in the filter without the necessity of increasing the diameter of the unit.

The filter unit shown by Malcolm has the advantage of increasing the surface area of the filter medium. However, the folds are part of an integrally formed filter media. Therefore, the design does not permit more or less surface area to be used in accordance with particular needs. Further, the central aperture of each stage reduces the amount of potential surface area of the filter material that is actually used for filtration.

U.S. Pat. No. 2,227,959 to Cover shows a filter composed of three elements connected to one another. The three elements are each structured differently from one another so as to be placed at an assigned position in the filter. However, the device requires specialized innermost and outermost filter elements, which would require that at least three types of filter units be kept in stock at all times. Further the construction of the filter shown in Cover, in which the filter walls are tucked into a cavity in a retaining plate, would be somewhat prone to leakage, compared to modern units in which the filter walls are sealingly engaged to one another around their periphery, and might not meet the more stringent standards in effect today, such as those promulgated by NIOSH. In addition, the central aperture of each stage reduces the amount of potential surface area of the filter material that is actually used for filtration.

U.S. Pat. No. 2,235,624 to Schwartz shows a filter unit for respirators having a cylindrical filter casing of a depth sufficient to hold two disk-shaped filter pads. The filter pad within the casing farthest away from the breathing mask is formed of two circular pads stitched together circumferentially at the edges to form the disk-shaped filter pad, and having an aperture formed through both circular pads to allow a supporting tube element to pass there through. The disk-shaped filter pad closest to the mask is formed similarly but is only apertured on one side. The supporting tube enters the aperture of this innermost pad and comes to an end therein without passing entirely through the innermost pad.

The filter unit taught by Schwartz has several disadvantages. For one thing, the requirement of rigidity of the outer cylindrical filter holder would tend to increase the weight of the mask. Also, the innermost filter pad is of a different construction than the outermost pad, which means that, similar to the situation in the Cover patent, two types of replacement filter elements must be maintained in stock. Further, the central aperture of each stage reduces the amount of potential surface area of the filter material that is actually used for filtration.

U.S. Pat. No. 2,951,551 to West shows an air purifying cannister that is formed from individual filtration units fitted together. Each unit has a male as well as a female connector and a rigid outer wall. The units may be mated in series ad infinitum to form a composite cannister of desired length. Each unit has a tube formed therethrough to allow for the passage of already-filtered air from one unit to the next. The tube is fitted with a cap on the unit farthest from the mask or source of suction to prevent unfiltered air from entering the tube.

The West filter unit, due to the requirement for rigidity, would become very heavy and would be very uncomfortable for the wearer after prolonged use, especially in comparison to the light-weight simple disk filter pad units currently preferred for long term use. Further the weight of the cannister, as additional units are added, would cause a great deal of stress to be applied to the air inlet of any mask using the filter, which may lead to fatigue of the connection materials and eventual breakage. Moreover, the central aperture of each stage reduces the amount of potential surface area of the filter that is actually used for filtration.

A common disadvantage of the types of filter units described above is the high ratio of non-functioning structural materials to functioning filtration material. As a result of this ratio, providing the user with increased filter surface area would result in an associated increase in weight of the filter. Modern filter units are expected to be light in weight, to ensure the comfort of the user.

A prevalent type of light-weight filter pad currently in use is the 3M® P100 Particulate filter, which consists of a single light-weight disk-shaped unit, formed of two fabric filter pads affixed to one another around the circumference of each pad. One of the filter pads has a central aperture being supported around its periphery by a plastic fastener integrally formed with a bayonet-style female connector, formed to enable a locking connection with a counterpart male connector at the input or inputs of a breathing mask.

However, while the 3M® P100 filter pad offers the advantage of light weight, due to its construction it can function only as a single unit. Further, because the pad is soft, installation and removal of the filter pad exerts torsional and crushing stress on the filter material as the user grips and twists the filter to engage or disengage the connector that mates with the mask. Moreover, the central aperture reduces the amount of potential surface area of the filter material that is actually used for filtration.

All of the filters discussed above having apertures punched through the filter material lose the filtration benefits of the material that has been punched out. As a result, a significant amount of the potential usable surface area of filter material is lost. Also, all of the filter devices discussed above utilize a direct connection to the respirator, necessitating a compatibility of filter and respirator design.

Further, the types of filters used in the industry currently to filter out gases, odors and/or vapors contain, in addition to filtration materials for filtering out particulate matter, absorbents, adsorbents and other such materials for removing harmful gases or the like. A commonly used adsorbent is activated carbon or charcoal.

Such cartridges typically have an inlet for receiving air to be filtered and an outlet for outputting filtered air and are constructed such that the filtration of the particulates is done at a first stage close to the inlet, by means of filtration material, after which the removal of gases, odors and/or vapors is effected by means of absorbents and/or adsorbents, situated closer to the outlet. Such a physical orientation is described in the industry in terms of the particulate filters residing "upstream", and the absorbents and/or adsorbents residing "downstream". In such a configuration, which is typical of the prior art, the media being filtered, usually air, passes uni-directionally, from the upstream filtration towards the downstream absorbents and/or adsorbents.

Examples of such prior art filter cartridges are shown in FIGS. 15A–15C. In each of these figures, AI represents the air inlet side and AO represents the air outlet side of the filter cartridge. FIG. 15C shows the air inlet sides of filters 1 and 2. FIG. 15B shows cartridge 2 with a respirator mask. Note that the receiving end of the mask corresponds to the air outlet side of the cartridge. All of the pictured prior art cartridges have surfaces that are entirely sealed except for the air inlet and outlet ports.

As a result of this uni-directionality, the area available for filtration is quite limited, in particular because in most cases the filters are mounted onto a respiration mask worn over the face of the user. Attempts have been made to increase the available surface area of the upstream filtration material by, for example, the use of pleated folds in the filtering material. However, while such pleating may introduce a deviation in the direction of the air flow, the deviation is negligible for all practical purposes, since air still goes into an inlet and out of an outlet substantially uni-directionally. Moreover, the amount of additional surface area that can be attained in this manner is limited, since only the inlet area can be utilized for this purpose.

As a result of the limited filtration area available in such uni-directional devices, the resulting pressure drop in the filter cartridge will be relatively high, and the efficiency of the filters will be correspondingly low, characteristics that will result in difficult breathing for the user and short life cycle for the filter cartridge.

The provision of a protective casing around the filter, such as is shown in FIGS. 15A–15C, may further limit the surface area available for filtration since typically a sealant is provided between the casing and the filter material, except at the input port.

Also, since people wearing such filters typically are involved in strenuous work, over long hours, breathing difficulties could drastically curtail their ability to carry out their work, and increase their fatigue. In addition, the shorter life cycle of the filters would necessitate frequent changes of the filter cartridges, with a corresponding interruption of work, resulting in a loss of efficiency, work time and quality.

Thus, there is a need for a filter cartridge that has an increased surface area for filtration, while increasing the comfort level of the user, even if a protective casing is required.

Further, there is a need for a filter device structured to permit easy and safe installation and removal of individual filter units, even in a contaminated area. Moreover, there is a need for a filter device having an indirect connection between the filter unit or units and the respirator to allow more flexibility in filter design independent of mask design considerations.

One of the very commonly experienced problems in using presently available breath protection equipment, is the difference in the level of protection experienced from the start of a fresh set of filtering units, and the level of protection and breathing comfort towards or at the end of the expected life cycle (end of life,) of these filter units. Most of these filters and filter units do not have an "end of life" indicator. This leaves it up to the user to estimate the life remaining in a filter, which may result in serious breathing discomfort, and sometimes a lack of protection. All of this can lead to the wearer's exhaustion, injury and damage to his or her health, and the resulting loss of productivity. As a result, wearers of these filter devices often end up discarding them long before the end of the expected life span, thereby increasing the cost of protection.

Another difficulty faced by users of filtration devices is the requirement that a monitoring of a change of sequence of a particulate and/or gas and vapor filter be performed.

In light of the foregoing, it becomes clear that a filtering device furthering the seemingly incompatible goal of improving efficiency, maximizing the use of available filter material area, while decreasing pressure drop, increasing the effective life span of the filtering device, and allowing for change of sequence monitoring of the filter, would represent a significant advance over the prior art.

SUMMARY OF THE INVENTION

In view of the above-mentioned problems of prior art devices, and the needs and concerns of users of filtration devices, it is an object of the present invention to provide a filtering device that demonstrates improved efficiency, maximizing the use of available filter material area, while exhibiting reduced pressure drop, an extended usable life span, and ideally a filter unit structured with absorbents and/or adsorbents to filter gases, odors and/or vapors and to cooperate with a filter platform. The filter unit or units together with the platform form the filter device to be mated to the respirator.

It is another object of the invention to provide a filter platform that can interface the filter units with the respirator and allow for the installation of end of life probes therein, obviating the need for customizing the respirator to provide such functionality, as well as allow for more flexibility in filter unit design due to the presence of the intermediate structure of the filter platform.

It is another object of the present invention to provide each individual wearer the ability to design fit the total filter device to his own comfort level, and at the same time maintain breathing comfort throughout his work period.

It is another object of the present invention to make it possible to keep very low levels of inventory of filters and filter devices, while providing adequate supply at the same time, by providing identical, interchangeable, and combinable filtration units.

It is another object of the present invention to monitor, sense, alarm or otherwise indicate an end of filter life or the presence of a defective filter. Additional objects and advantages of the present invention will become clear in view of the detailed description and the accompanying diagrams.

BRIEF DESCRIPTION OF THE DRAWINGS

FIGS. 3A–3D constitute a solid model view, a top view, a side view and a front view, respectively of a respirator mask adapter platform in accordance with another preferred embodiment of the present invention;

DETAILED DESCRIPTION OF THE PREFERRED EMBODIMENTS

Preferred embodiments of the present invention for a filter unit, filter platform and filter device formed by the filter unit and filter platform will now be described with reference to the accompanying drawings.

The air filtration device of the present invention is designed to be coupled to a respirator mask and generally comprises a filter adapter platform coupled with one or more filter respirator cartridges or units. The filter device of the present invention employs advantageous structure which allows for filter units, in the form of cartridges, to have the filter material at both lateral sides of the filter unit completely unencumbered by an inhalation port or a connection device. By eliminating such elements, the full area of the filter material can be utilized for filtering, thus increasing airflow and reducing pressure drop. The advantageous design of the filter unit includes an annular edge member formed around the periphery of the filter unit. The edge member is an annular strip, preferably of rigid or semi-rigid material, to which the peripheral edges of each lateral wall of the filter are sealingly attached. The edge member maintains the space between the filter walls and provides structure for placement of an aperture for passage of filtered air to a stage of the filtration device closer to the respirator, that is, the source of suction. In the preferred embodiment to be described in more detail below, this closer stage is the filter platform of the present invention.

Another advantageous feature of the filtration device of the present invention is the provision of the filter platform itself between the filter unit or units and the respirator. As will be developed, the structure of the filter platform allows for placement of test probes as well as the introduction of materials to be inhaled by the user during use of the respirator. The filter platform, by its presence, allows for filter units to be designed with less concern for connector compatibility with the respirator mask. Thus, by providing an appropriate platform, filter units of one manufacturer may be able to be used with a respirator of a second manufacturer, even where such filters are typically not compatible with such respirators.

While it is advantageous to have a separate filter platform, the invention is not limited to the illustrated embodiments. For example, the advantageous platform structure described in detail below may be formed integrally as part of the filter cartridge or cartridges, or as a part of the respirator mask, all within the spirit and scope of the claimed invention.

Figure 1A:
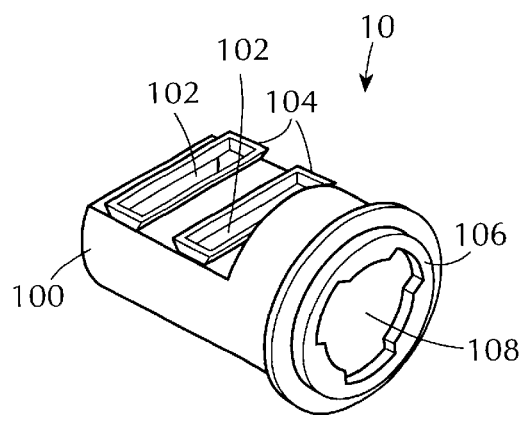
FIGS. 1A–1D constitute a solid model view, a top view, a side view and a front view, respectively of a respirator mask adapter platform in accordance with a preferred embodiment of the present invention.

FIGS. 1A–1D show a respirator mask adapter platform that forms a part of the filter device according to a first embodiment of the present invention. As shown in FIG. 1A, the platform 10 includes a substantially hollow housing 100 preferably constructed of a strong, lightweight material such as plastic or aluminum. The platform has filter receiving openings 102 on an upper flat surface of the platform 10. Surrounding the filter receiving openings 102 are tapered filter connection members 104. The tapered connection members 104 are structured to mate with corresponding connectors on the filter cartridges to be discussed below to sealingly engage the filter cartridges, by means of sliding, with the platform 10. Mask connection member 106 is structured to mate with a corresponding member on a respirator (not shown) to sealingly engage the platform with the respirator.

The mask connection member 106 is shown in the figure as a bayonet style connector. However, both the filter connection member 104 and the mask connection member 106 may be of any connector type that allows for a secure seal, such as, for example, snap-on, press fit, push and twist, or the like. Chamber 108 is formed by the housing 100 and in use holds a residual volume of filtered air.

Figure 1B:
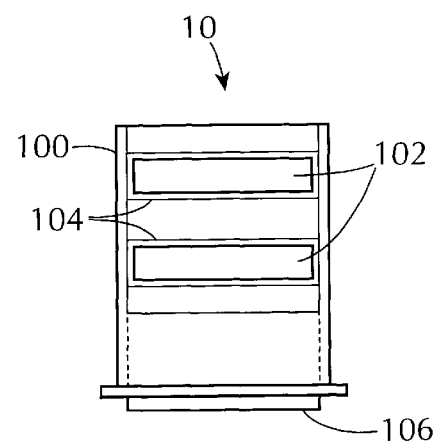
Figure 1C:
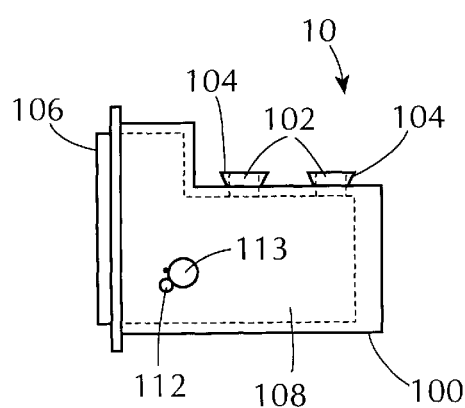
Figure 1D:
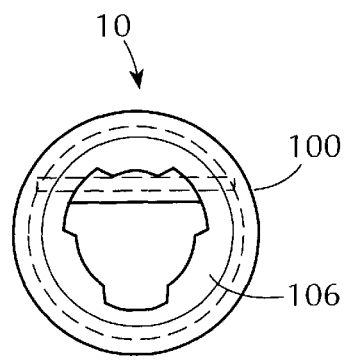

FIGS. 1B through 1D show the platform 10 from several different angles, with like reference numerals referencing like components. Probe port 112, visible in the side view of FIG. 1C, allows for the secure placement of a probe, such as an end of life probe or introduction of atomized medication, such as for asthma sufferers, into the platform, and eventually into the respirator. Port cover plate 113 is attached to the housing 100 so as to enable it to swing down to cover the port 112 when the port 112 is not in use. Of course, as will be appreciated, multiple ports and corresponding cover plates may be provided. The ports can be used to introduce a sensor to sense an increase in gas or vapor fumes as well as particles. The ports can also be used in conjunction with an emergency oxygen or compressed air support system.

Preferably, the sensing mechanism attached at the port or ports are sealed and locked in place by any known technique, such as snap-fit, press fit, push-and-twist, and the like.

Figure 2A:
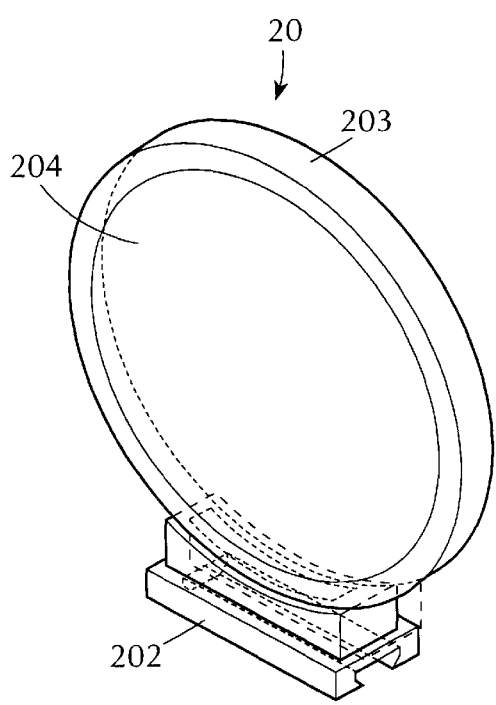
FIGS. 2A–2E constitute a solid model view, a bottom view, a right side view, a front view and a left side view, respectively, of a filter respirator cartridge of a preferred embodiment of the present invention.
Figure 2B:
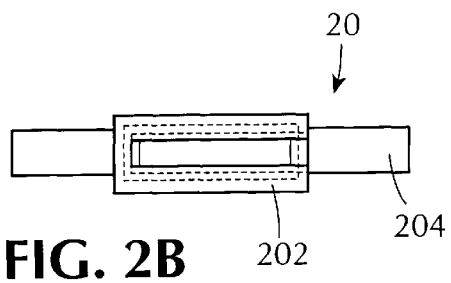
Figure 2D:
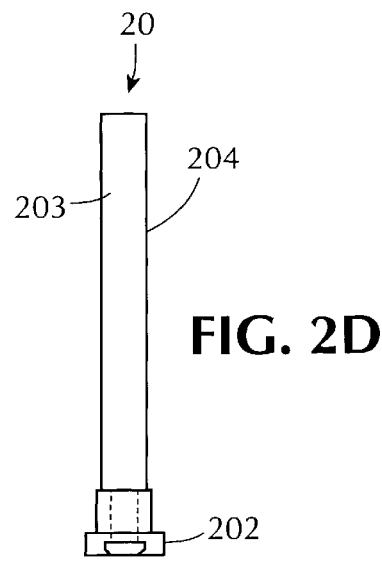
Figure 2C:
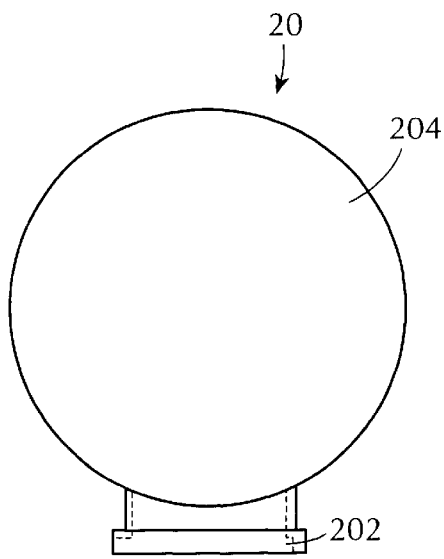
Figure 2E:
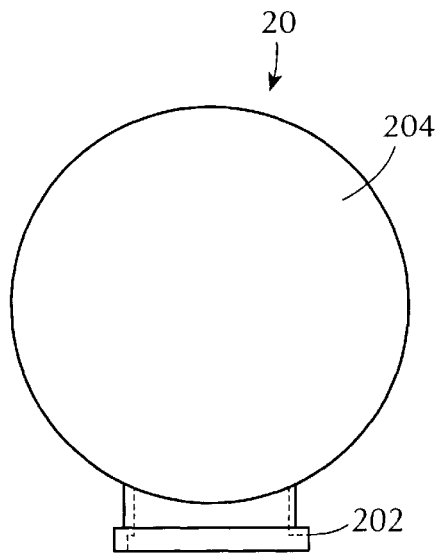

FIGS. 2A–2E show an individual filter cartridge in accordance with the first embodiment of the present invention. As shown in FIG. 2A, the filter cartridge 20 comprises filter disk 204, which is made of a filter material and which is substantially hollow. The disk 204 is apertured at the bottom of annular edge portion 203 and integrally engaged at that point along the edge portion 203 to connection member 202. The connection member 202 is structured to mate with tapered connection members 104 of the platform to sealingly engage the filter cartridge 20 to the platform 10 to form a filter device of the present invention. FIGS. 2B through 2E are bottom, right side, front and left side views, respectively, of the filter cartridge 20.

In a second embodiment of the filter platform of the present invention, the platform is provided with only one filter aperture. However, as will be seen, filter cartridges of single and dual nature will be illustrated, allowing, in the preferred embodiments, for a filter device having one or two filter disks. Of course, the invention is not limited to two filter disks and may include multiple disks, as will be understood after reading the specification.

FIGS. 3A through 3D show a filter platform 30 according to the second embodiment. As shown in FIG. 3A, the platform 30 includes a substantially hollow housing 300 preferably constructed of a strong, lightweight material such as plastic or aluminum. The platform has filter receiving opening 302 on an upper flat surface of the platform 30. Surrounding the filter receiving opening 302 is tapered filter connection member 304. The tapered connection member 304 is structured to mate with corresponding connector on the single or dual filter cartridges to be discussed below to sealingly engage the filter cartridge, by means of sliding, with the platform 30. Mask connection member 306 is structured to mate with a corresponding member on a respirator (not shown) to sealingly engage the platform with the respirator. The mask connection member 306 is shown in the figure as a bayonet style connector. However, as in the first embodiment, both the filter and mask connection members may be of any type that allows for a secure seal. Chamber 308 is formed by the housing 300 and in use holds a residual volume of filtered air.

FIGS. 3B through 3D show the platform 30 from several different angles, with like reference numerals referencing like components. FIG. 3C shows butterfly valve 310 which blocks the entry of air into the platform when no filter cartridge is attached, such as when the cartridge is being changed. While not shown in conjunction with the first embodiment described above, the butterfly valve may also be used in that embodiment. The swivel axle of the butterfly valve 310 may protrude out of the housing to allow the user to twist the valve into the open and closed positions, as desired. The butterfly valve 310 is mounted at the air entry internal side of the platform's filter connection member 304. When activated in the open position, the butterfly portion of the valve will extend above the level of the connection member 304, preventing the filter cartridge from being removed. Only when the butterfly valve is in the closed and sealed position can a filter be removed, protecting the user from inhaling contaminated air. Probe port 312 and port cover plate 313 function the same way in the second embodiment as in the first and the description will not be repeated here.

Figure 4A:
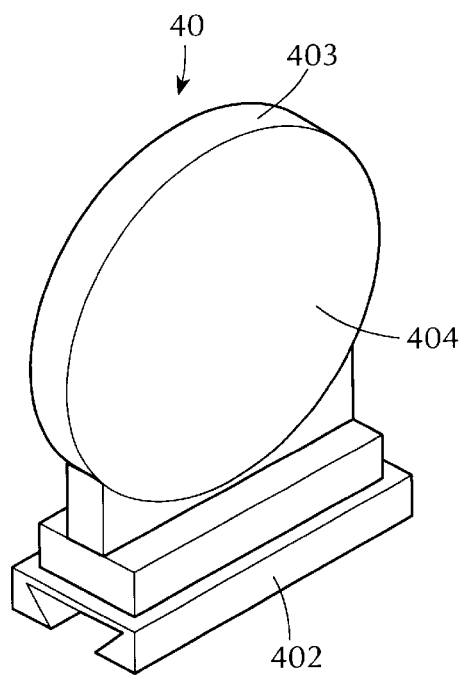
FIGS. 4A–4E constitute a solid model view, a bottom view, a right side view, a front view and a left side view, respectively, of a filter respirator cartridge of another preferred embodiment of the present invention.
Figure 4B:
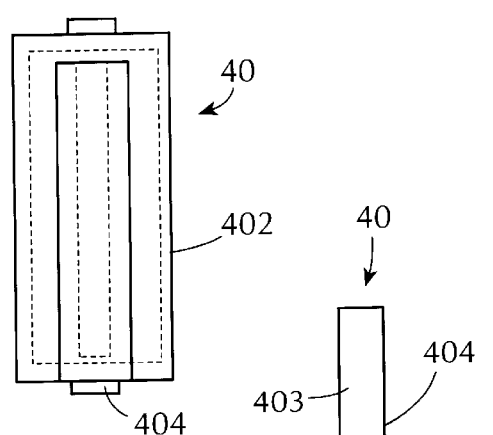
Figure 4D:
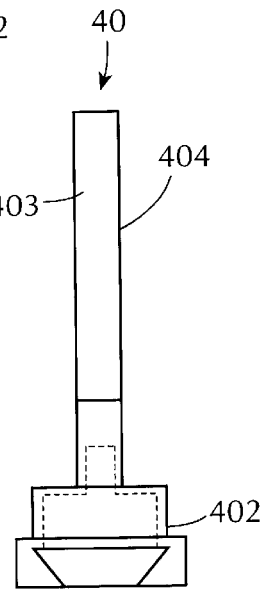
Figure 4C:
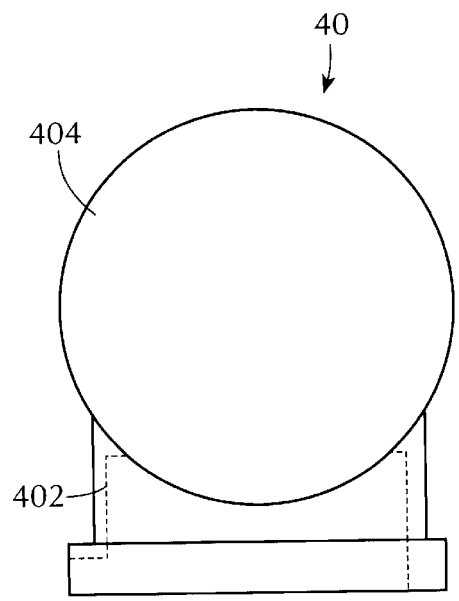
Figure 4E:
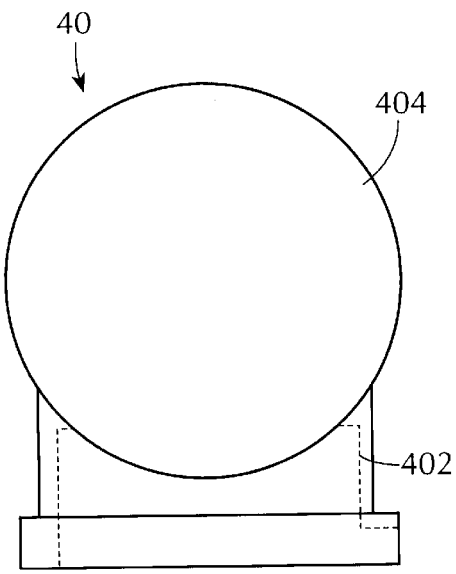

FIGS. 4A–4E show an individual filter cartridge 40 in accordance with the second embodiment of the present invention. As shown in FIG. 4A, the filter cartridge 40 comprises filter disk 404, which is made of a filter material and which is substantially hollow. The disk 404 is apertured at the bottom of annular edge portion 403 and integrally engaged at that point along the edge portion 403 to connection member 402. The connection member 402 is structured to mate with tapered connection member 304 of the platform to sealingly engage the filter cartridge 40 to the platform 30 to form a filter device of the present invention. FIGS. 4B through 4E are bottom, right side, front and left side views, respectively, of the filter cartridge 40.

Figure 5A:
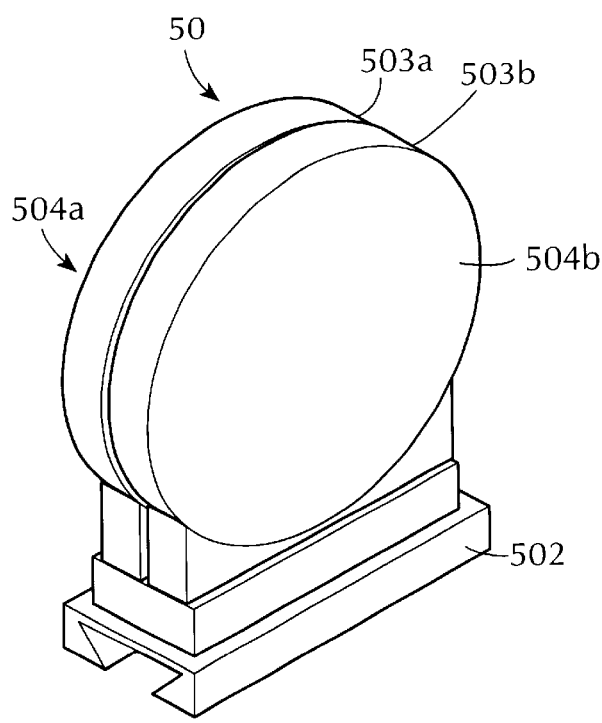
FIGS. 5A–5D constitute a solid model view, a bottom view, a side view and a front view, respectively, of a multiple filter respirator cartridge of a preferred embodiment of the present invention.
Figure 5B:
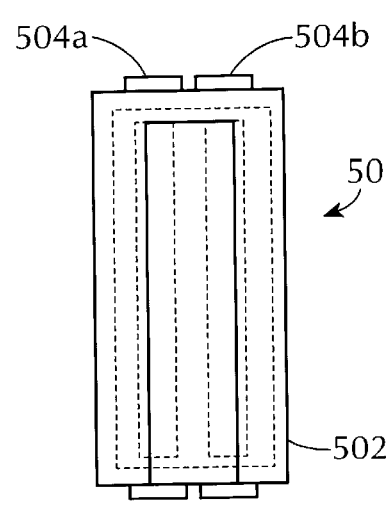
Figure 5C:
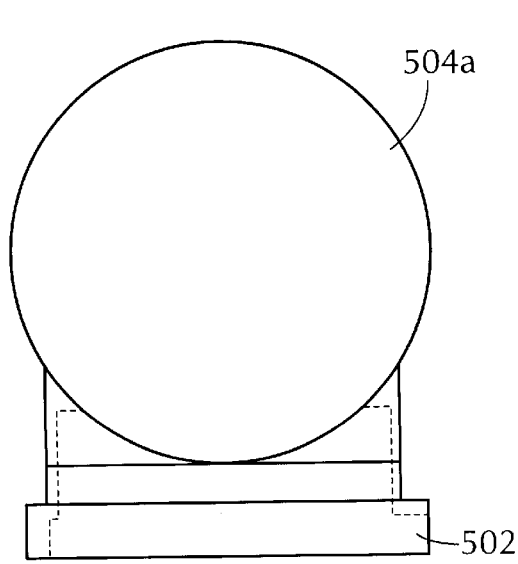
Figure 5D:
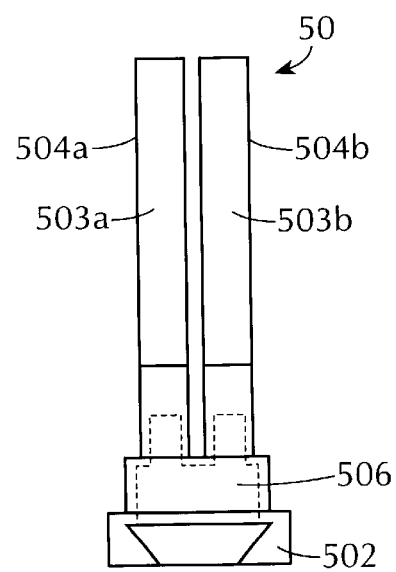

FIGS. 5A–5D show a multiple filter cartridge 50 in accordance with the second embodiment of the present invention. As shown in FIG. 5A, the filter cartridge 50 comprises filter disks 504a and 504b, each of which is made of a filter material and which is substantially hollow. The disks are apertured at the bottom of annular edge portions 503a and 503b, respectively, and integrally engaged at that point to connection member 502. The connection member 502 is structured to mate with tapered connection member 304 of the platform to sealingly engage the filter cartridge 50 to the platform 30 to form a filter device of the present invention. FIGS. 5B through 5D are bottom, side and front views, respectively, of the filter cartridge 50. As can be seen in FIG. 5B, a chamber 506 is formed at the base of connection member 502 in which filtered air resides. This air is drawn in upon receiving suction through the platform, the suction typically originating from the user's lungs.

Figure 6A:
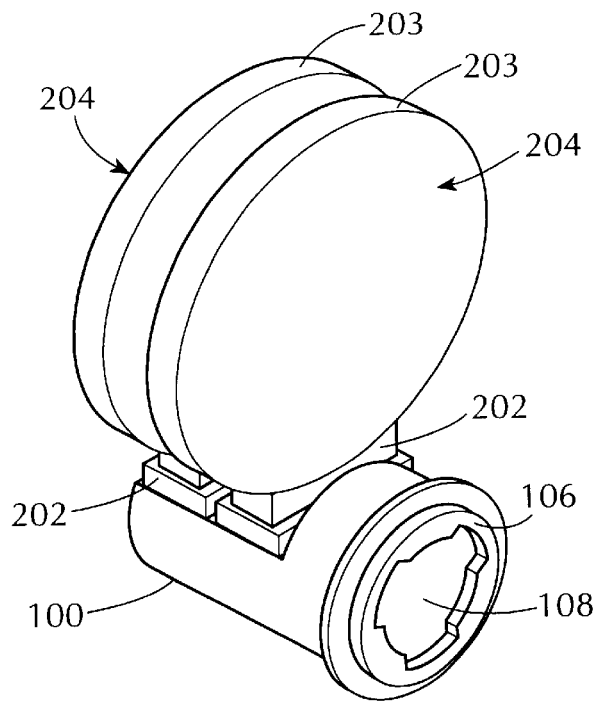
FIGS. 6A and 6B constitute a solid model view and a side view, respectively, of a filter device in accordance with the first embodiment of the present invention, combining the filter cartridges shown in FIGS. 2A–2E with the platform shown in FIGS. 1A–1D.
Figure 6B:
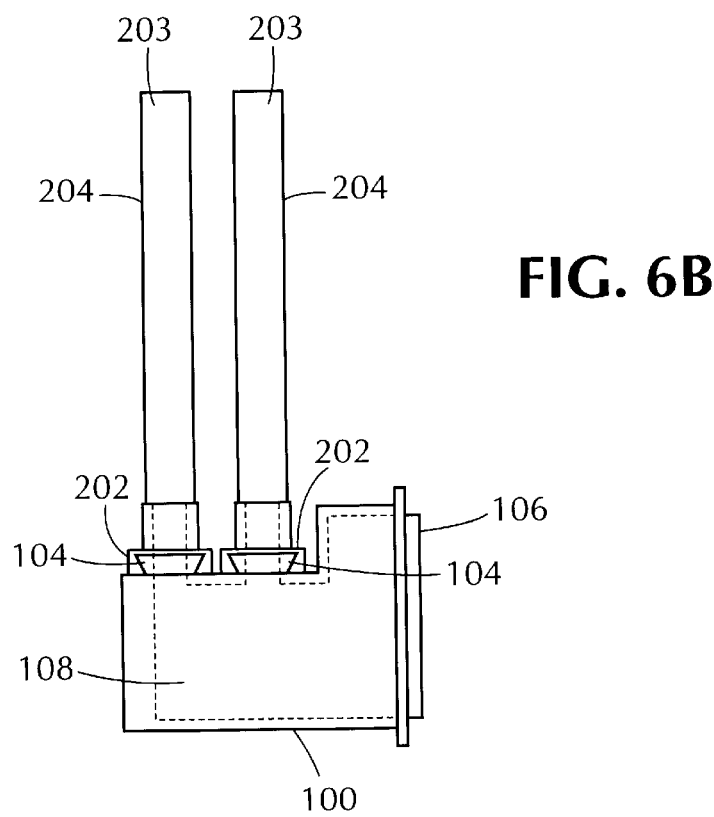

FIGS. 6A and 6B show a filter device according to the first embodiment of the present invention constructed of a platform 10 in accordance with the first embodiment, as was described above with reference to FIGS. 1A–1D, combined with two filter cartridges 20 in accordance with the first embodiment, as was described above with reference to FIGS. 2A–2E. As can be seen from FIG. 6A, each of the filter cartridges 20 is connected, by means of connection members 202 to the tapered filter connection members of the platform, which are visible in the side view of FIG. 6B. When combined, the filter cartridges are sealingly engaged to the platform such that when the user of the respirator breathes in, unfiltered air is drawn through the material of filter disks 204, down into the chamber 108 and out the front of the platform into the respirator. The presence of the volume of filtered air makes breathing easier due to the much lower pressure drop encountered during its inhalation. This can significantly increase the comfort of the user.

Figure 7A:
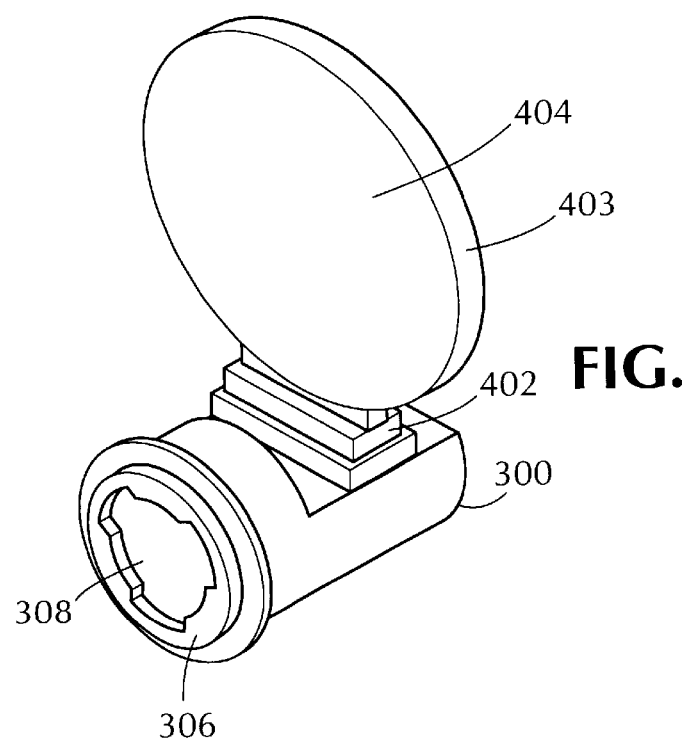
FIGS. 7A and 7B constitute a solid model view and a side view, respectively, of a filter device in accordance with the second embodiment of the present invention, combining the filter cartridge shown in FIGS. 4A–4E with the platform shown in FIGS. 3A–3D.
Figure 7B:
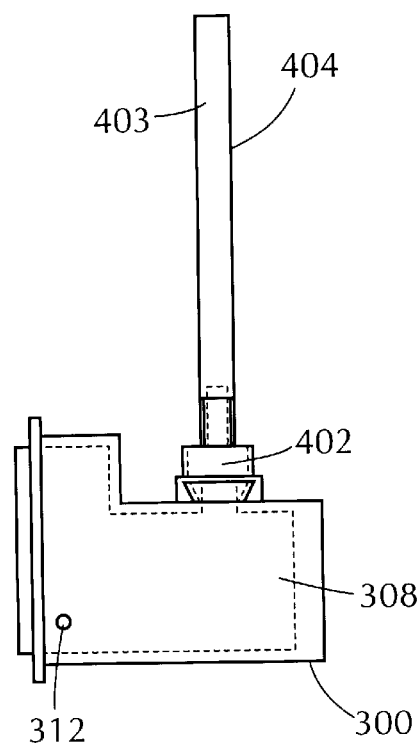

FIGS. 7A and 7B show a filter device according to the second embodiment of the present invention constructed of a platform 30 in accordance with the second embodiment, as was described in FIGS. 3A–3D, combined with a filter cartridge 40 in accordance with the second embodiment, as was described above with reference to FIGS. 4A–4E. As can be seen from FIG. 7A, filter cartridge 40 is connected, by means of connection member 402 to the tapered filter connection member 304 of the platform, which is visible in the side view of FIG. 7B. When combined, the filter cartridge is sealingly engaged to the platform such that when the user of the respirator breathes in, unfiltered air is drawn through the material of filter disk 404, down into the chamber 308 and out the front of the platform into the respirator. As mentioned above, the presence of the volume of filtered air makes breathing easier.

Figure 8A:
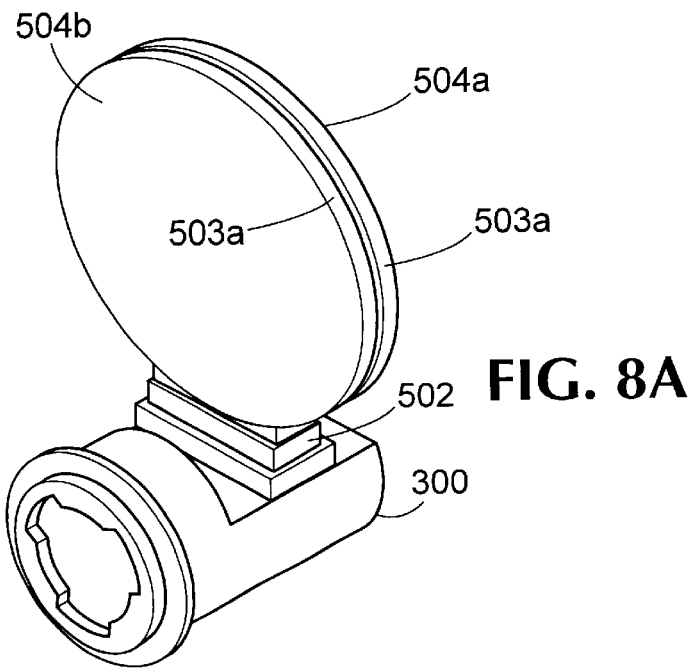
FIGS. 8A and 8B constitute a solid model view and a side view, respectively, of a filter device in accordance with the second embodiment of the present invention, combining the filter cartridge shown in FIGS. 5A–5D with the platform shown in FIGS. 3A–3D.
Figure 8B:
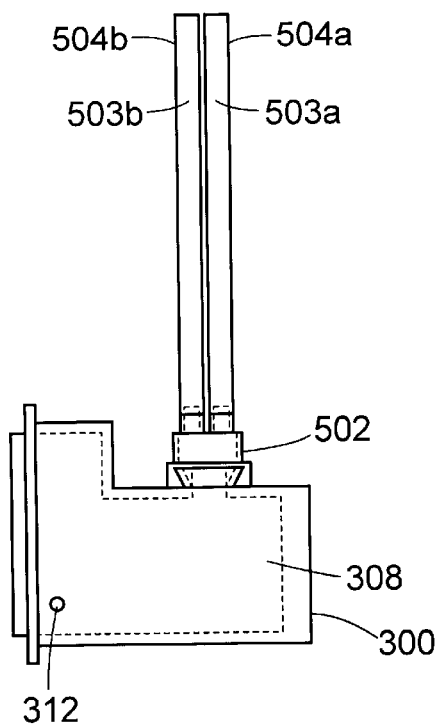

FIGS. 8A and 8B show a filter device according to the second embodiment of the present invention constructed of a platform 30 in accordance with the second embodiment, as was described in FIGS. 3A–3D, combined with dual filter cartridge 50 in accordance with the second embodiment, as was described above with reference to FIGS. 5A–5D. As can be seen from FIG. 8A, dual filter cartridge 50 is connected, by means of connection member 502 to the tapered filter connection member 304 of the platform, which is visible in the side view of FIG. 8B. When combined, the dual filter cartridge is sealingly engaged to the platform such that when the user of the respirator breathes in, unfiltered air is drawn through the material of filter disks 504a and 504b, down into the chamber 308 and out the front of the platform into the respirator.

In accordance with another advantageous aspect of the present invention, a filter cartridge is provided that utilizes bi/multi-directional air flow for combination filtering of particulate matter as well as gases, odors, and/or vapors.

The cartridge type particulate/gas filters, according to a preferred aspect of the present invention, have bi/multi-directional filtration capability, compared to the uni-directional capability of previous filter cartridges. As a result of this advantageous feature, the particulate filtration area is increased significantly, thereby not only reducing the pressure drop, and hence increasing the breathing comfort, but also increasing the efficiency of the filters, thereby increasing the protection factor. The increase in area occurs because the bi/multi-directional air flow paths allow access to the filter material from many more directions than in uni-directional cartridges, which have a single inlet.

Since the lung capacity of the user is usually constant for most practical purposes, and the available filtration area is significantly higher due to the present invention, the air, or the media being filtered, gets filtered at much lower rates, or speeds. As will be appreciated by those well versed in the art, this not only increases the efficiency of the filter, but also improves the dust holding capacity of the filter. The increased filtration area of the present invention enhances the life cycle of such filters significantly. Moreover, in filter cartridges constructed in accordance with the present invention, the functional parts, i.e., filters, and/or absorbants, adsorbents, etc., constitute an overwhelming percentage of the material making up the cartridge type filters. This is to be contrasted with the high percentage of non-functioning (non-filtering) parts and material used in existing cartridge type filters, which may include, for example, plastic and/or metal casings, housings, sealants, separators, and the like. As a result, filters constructed in accordance with the present invention have a tremendous "weight-to-performance" advantage, compared to existing cartridge type filters. It is worthwhile noting that the weight of cartridge type filters, or any type of filters, is an important factor, since the wearer is carrying them while in use, as they become part of the safety equipment worn.

FIGS. 9A through 9D show a filter platform 90 that will be used to describe the bi/multi-directional filter cartridge of the present invention. It should be noted that the bi/multi-directional filter cartridge of the present invention is not limited to being used with the illustrated platform, but may use other platforms described above, or may mate with respirator masks having integrally formed platform components, or the filters and platforms may be formed integrally.

Figure 9A:
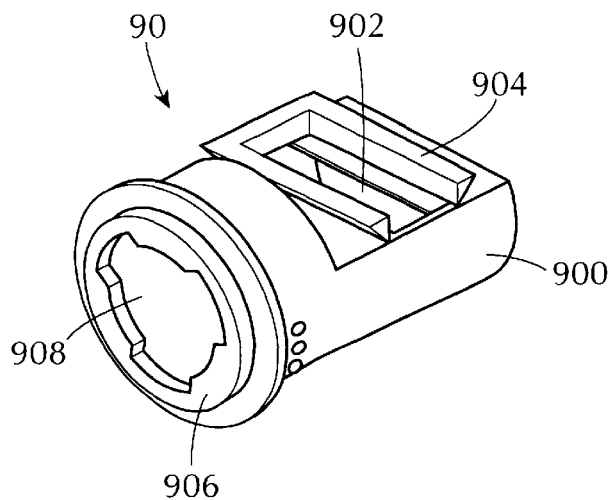
FIGS. 9A–9E constitute a solid model view, a top view, a side view, a front view, and a valve, respectively of a respirator mask adapter platform in accordance with another preferred embodiment of the present invention.

As shown in FIG. 9A, the platform 90 includes a substantially hollow housing 900 preferably constructed of a strong, lightweight material such as plastic or aluminum. The platform has filter receiving opening 902 on an upper flat surface of the platform 90. Surrounding the filter receiving opening 902 is tapered filter connection member 904. The tapered connection member 904 is structured to mate with corresponding connector on the bi/multi-directional filter cartridge to be discussed below to sealingly engage the filter cartridge, by means of sliding, with the platform 90. Mask connection member 906 is structured to mate with a corresponding member on a respirator (not shown) to sealingly engage the platform with the respirator. Alternately, the platform structure described herein may be integrally formed with the mask. The mask connection member 906 is shown in the figure as a bayonet style connector. However, both the filter and mask connection members may be of any type that allows for a secure seal. Chamber 908 is formed by the housing 900 and in use holds a residual volume of filtered air.

Figure 9B:
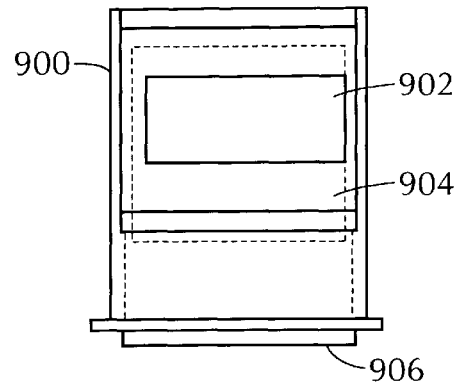
Figure 9C:
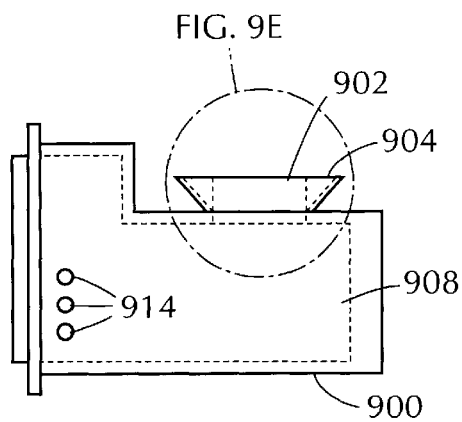
Figure 9D:
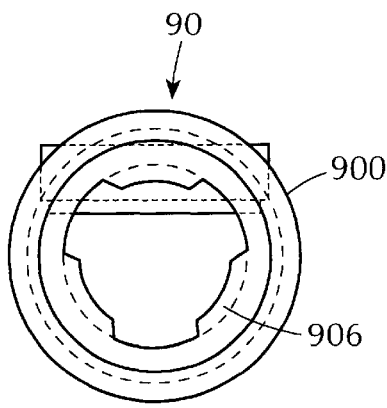
Figure 9E:
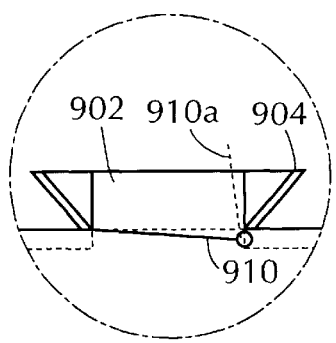

FIGS. 9B through 9D show the platform 30 from several different angles, with like reference numerals referencing like components. FIG. 9E shows sealing valve 910 which blocks the entry of air into the platform when no filter cartridge is attached, such as when the cartridge is being changed. While not shown in conjunction with the previous embodiments described above, the valve may also be used in those embodiments. The swivel axle of the sealing valve 910 preferably protrudes out of the housing to allow the user to twist the valve into the open and closed positions, as desired. The valve 910 is mounted at the air entry internal side of the platform's filter connection member 904 preferably running the length of the opening to fully seal the opening. When activated in the open position 910a, the valve will extend above the level of the connection member 904, preventing the filter cartridge from being removed. Only when the valve is in the closed and sealed position can a filter be removed, protecting the user from inhaling contaminated air.

Monitoring ports 914 are available for monitoring the condition of the filter. This capability is important because although a filter may be certified when it is packaged to have a particular pressure drop, damage may occur to the filter during shipping, packaging, or other stages between testing and usage. Thus, it would be extremely advantageous to have the ability for the user to be sure that when he or she installs a new filter, the pressure drop of the filter is within the limits appropriate for that particular filter.

Further, as a filter is used, the amount of pressure required to breathe with that filter increases due to the gradual clogging of the filter. It would be extremely advantageous to be able to detect the pressure required to breath through the filter at any given time to allow the user, or monitoring equipment, to determine if the pressure drop is too high. The occurrence of too high a pressure would indicate an end of life, while the occurrence of too low a pressure would be indicative of a defective filter. To achieve this functionality, the monitoring holes of the present invention may be used for insertion of pressure monitoring apparatus, such as a manometer, or a tube leading to a manometer, or an electronic equivalent of same. Armed with the monitored information as to the current pressure within the filter platform, end of filter life and filter defects can easily be detected. The invention is not limited to the number or position of the ports shown in the figures.

FIGS. 10A through 10G illustrate a bi/multi-directional filter cartridge according to the present invention. As described above, such a filter cartridge functions to filter both particulate and gaseous contaminants.

The bi/multi-directional filter cartridge includes a base 1002, which has a shape that enables it to slidingly and sealingly engage the cartridge to platform connection member 904. An outer structure having air filter material 1004 is provided above the base and is formed of a filtration material of the type that filters out particulates. Details of the filter structure will be provided below.

When changing filters in a contaminated environment, even if the valve 910 has been properly used, a small residual amount of contaminated air may remain in the valley-like area above the valve when the spent cartridge has been removed and the new filter cartridge has not yet been installed. To solve this problem, the present invention advantageously provides a structure, a seal slide 1006, that functions during installation to sweep out the residual volume of contaminated air.

As can be seen from FIGS. 10A through 10D, in the uninstalled cartridge, a seal slide purge plate 1008, formed at the end of the seal slide 1006, initially resides at one end of the hollow channel in the base of the filter. As the filter cartridge slides onto the connection member during installation, the purge plate 1008 is positioned at the trailing edge of the channel of the cartridge base 1002. Once the base 1002 is completely slid onto the connection members 904, and before the valve 910 is opened, the user pulls the seal slide out, which causes the purge plate 1008 to sweep across the channel, driving the contaminated air out of the air release vents 1016, shown in FIG. 10G, the only direction of escape for the contaminated air.

The end portion of the seal slide 1008 that is left within the channel includes the purge plate 1008, which now rests flush against the air release vents 1016, sealing off those vents. The excess portion of the seal slide that now protrudes from the base may now be broken off by the user rocking the seal slide 1006 along the seal slide break point 1010, as shown in FIG. 10C.

Figure 10A:
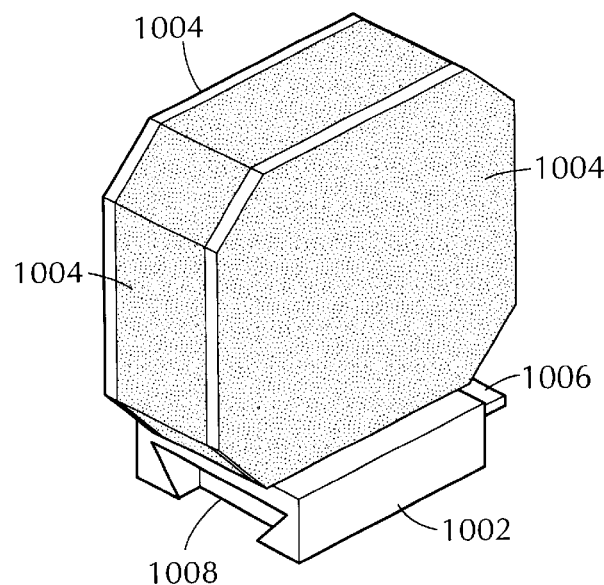
FIGS. 10A–10D constitute a solid model view, a bottom view, a right side view and a front view, respectively, of a bi/multi-directional filter respirator cartridge of another preferred embodiment of the present invention.
Figure 10B:
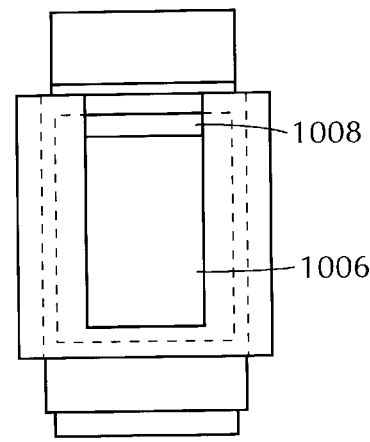
Figure 10C:
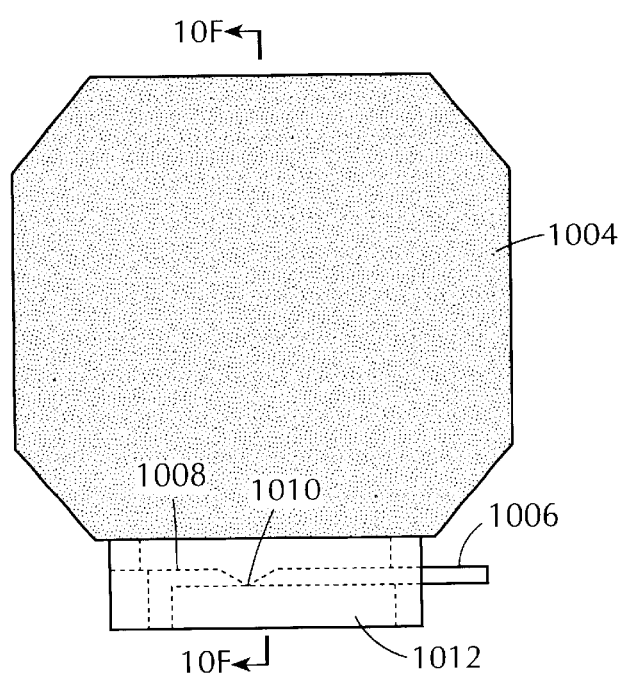
Figure 10D:
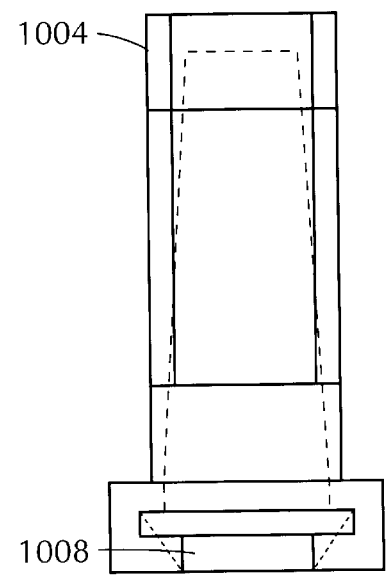
Figure 10E:
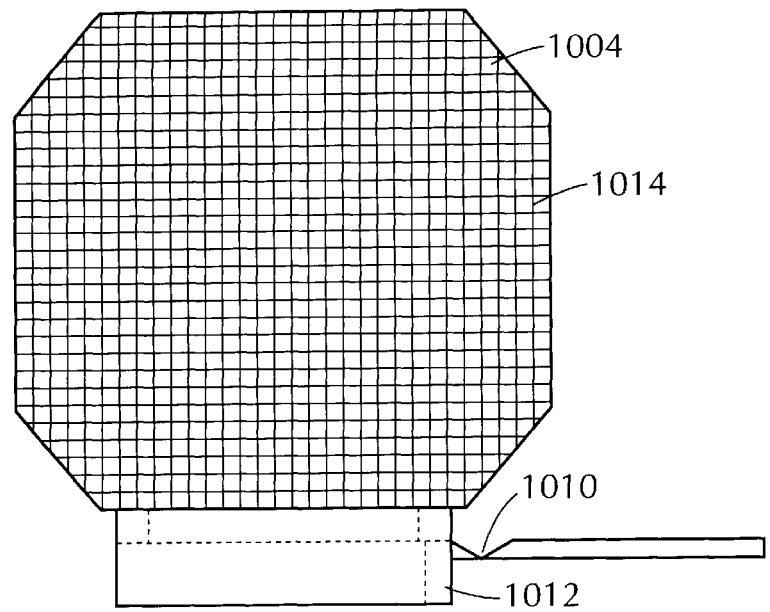
FIG. 10E is a cross-sectional view along lines B—B of FIG. 10D.
Figure 10F:
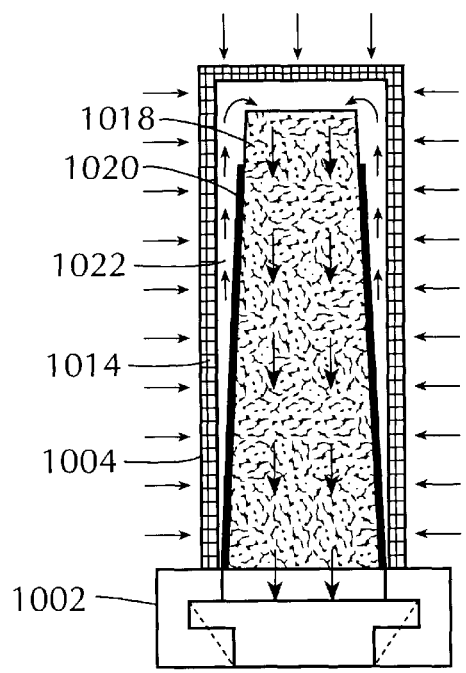
FIG. 10F is a cross-sectional view along lines A—A of FIG. 10C.
Figure 10G:
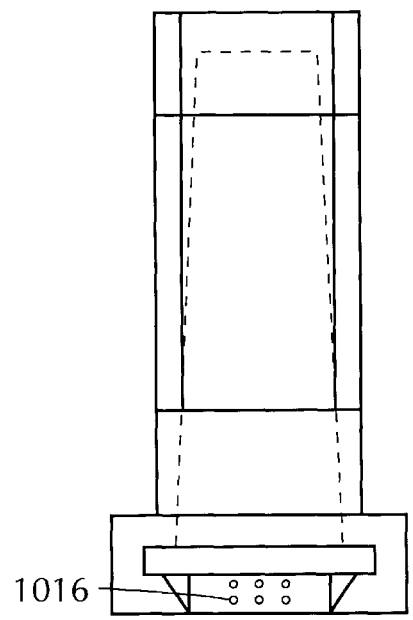
FIG. 10G is a rear view of the bi/multi-directional filter respirator cartridge shown in FIGS. 10A–10F.
Figure 11A:
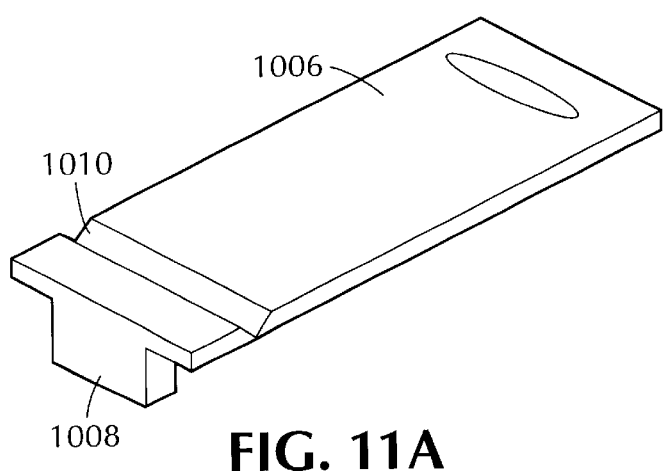
FIGS. 11A–11D are a solid model view, top view, right side view, and front view, respectively, of a seal slide and purge plate according to the present invention.
Figure 11B:
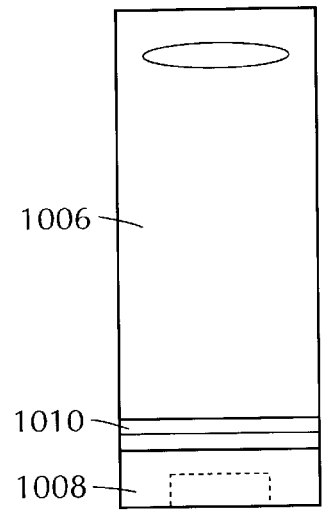
Figure 11C:
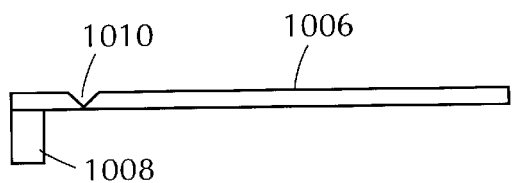
Figure 11D:
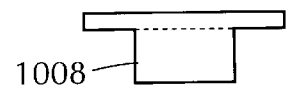

Details of the internal structure of the bi/multi-directional filter cartridge are explained in FIGS. 10E through 10G. FIG. 10E is a sectional drawing along lines B—B in FIG. 10D. In addition to illustrating the final position of the seal slide 1006 after installation, as discussed above, FIG. 10E shows the structure of the filter support grid 1014. The filter support grid 1014 is a rigid or semi-rigid structure that supports the air filter material 1004 and causes it to maintain its shape. This rigidity allows for the proper air flow to be maintained within the filter, as will be discussed below.

FIG. 10F is a cross sectional view along the line A—A in FIG. 10C. As shown in the figure, the filter cartridge of the present invention advantageously is constructed to allow the bi-directional and/or multi-directional flow of air from outside the filter cartridge, through the particulate filter material 1004, and then through an appropriate amount of a gas/vapor adsorber/absorber 1018.

By virtue of the illustrated structure of the filter cartridge, air may enter from any direction into the filter cartridge, as is shown by the air direction arrows in the figure. Once air has entered the cartridge, it is drawn through an appropriate amount of a gas/vapor adsorber/absorber 1018, which purifies the air of noxious gases, odors, and the like. To achieve this, an air plenum 1022 is formed between the filter support grid 1014 and a non-porous plenum wall 1020 formed on an outside portion of the gas/vapor adsorber/absorber 1018. The filter support grid 1014 maintains the shape of the filter walls 1004 and allows the formation of air plenum 1022, which is formed between the filter walls and the gas/vapor adsorber/absorber 1018. While the present invention is described in terms of a support grid, the invention is not limited to that implementation. For example, the filter walls themselves can be made of a material of sufficient stiffness to maintain the required shape, achieving the same functionality without the provision of the filter grid. Further, the support member, if any, need not be in the shape of a grid.

Since the amount of adsorption, for example, that occurs in a material such as activated charcoal corresponds to the amount of time a gas is in contact with the activated charcoal, it is important that the air to be filtered be in contact with the activated charcoal or other adsorber/absorber for the time required to sufficiently decontaminate the air. In the filter cartridge of the present invention, this is achieved by providing the non-porous plenum wall 1020 that extends an appropriate amount of the way up the height of the gas/vapor adsorber/absorber 1018 and ensures that air in the air plenum 1022 enters the gas/vapor adsorber/absorber 1018 at a location that ensures the air will pass through a significant amount of the adsorber/absorber 1018 on its way to the user's lungs.

As is shown in the figure, when the user inhales, the air flows into the cartridge from any direction, through the particulate filter material 1004, and then, either immediately, or after having flowed up the air plenum 1022, into the top of the gas/vapor adsorber/absorber 1018. Once in the gas/vapor adsorber/absorber 1018, the air continues through the gas/vapor adsorber/absorber 1018 and out of the cartridge, into the platform.

A further advantageous feature of the filter cartridge of the present invention is the tapered shape of the gas/vapor adsorber/absorber 1018. This tapered shape places most of the weight of the gas/vapor adsorber/absorber 1018 towards the bottom of the cartridge, closer to the platform, reducing stresses on the connection between the cartridge and the platform that are due to the cantilever effect.

FIGS. 11A through 11D show the seal slide 1006 from various angles. As discussed above, the seal slide 1006 has a seal slide purge plate 1008, which, when the seal slide is utilized, functions to sweep contaminated air out of the channel at the base of the filter cartridge. Such air is swept out through air release vents 1016. The seal slide purge plate, after installation of the filter cartridge, rests flush with the air release vents to prevent outside air from entering through the vents. Once the filter cartridge is in place, the excess protruding portion of the seal slide can be removed by snapping off the excess at seal slide break point 1010.

Figure 12A:
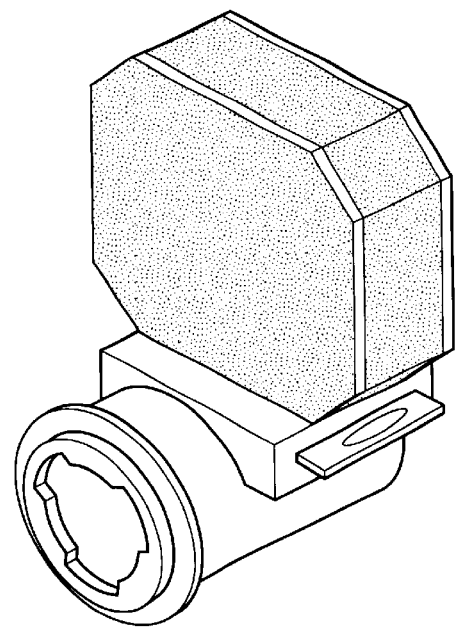
FIGS. 12A and 12B are two views of a bi/multi-directional filter respirator cartridge engaged to a filter platform in accordance with the present invention, the cartridge having an octagonal shape.
Figure 12B:
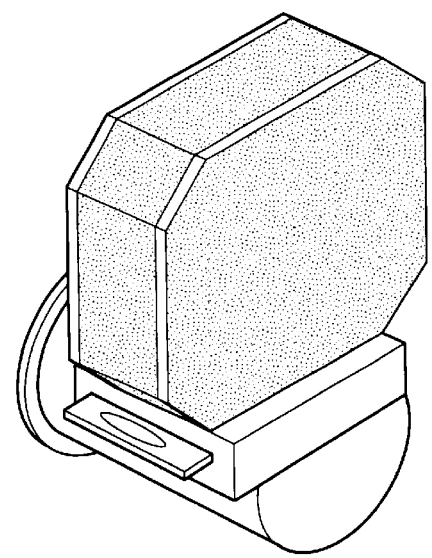
Figure 13A:
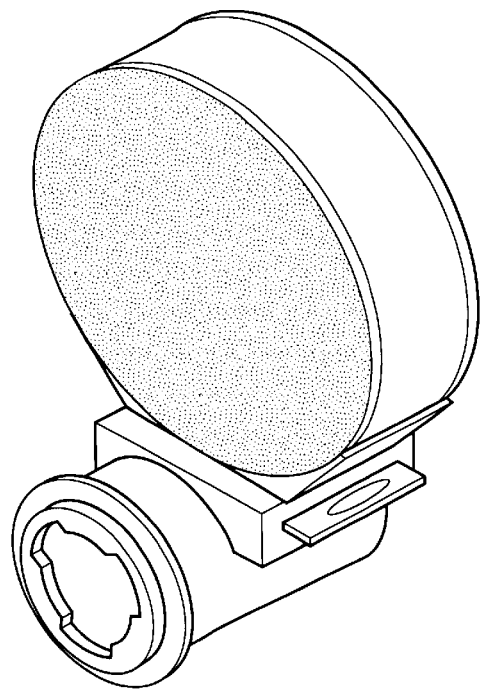
FIGS. 13A and 13B are two views of a bi/multi-directional filter respirator cartridge engaged to a filter platform in accordance with the present invention, the cartridge having an circular shape.
Figure 13B:
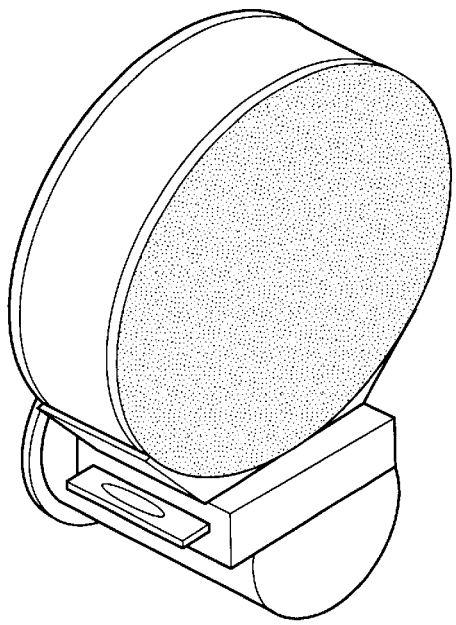
Figure 14A:
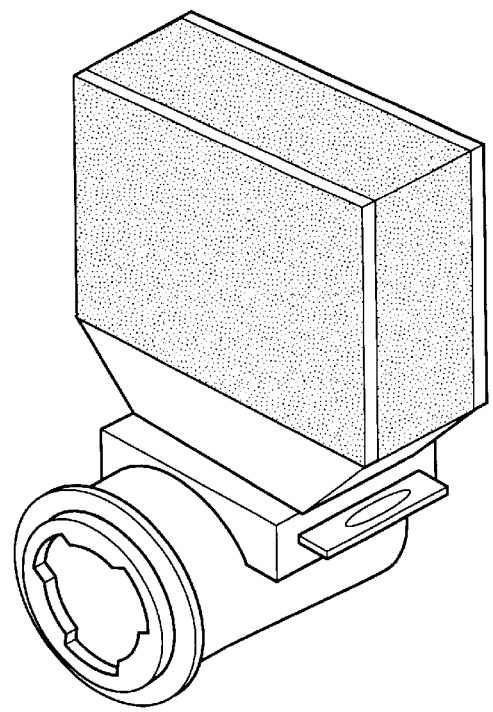
FIGS. 14A and 14B are two views of a bi/multi-directional filter respirator cartridge engaged to a filter platform in accordance with the present invention, the cartridge having an rectangular shape.
Figure 14B:
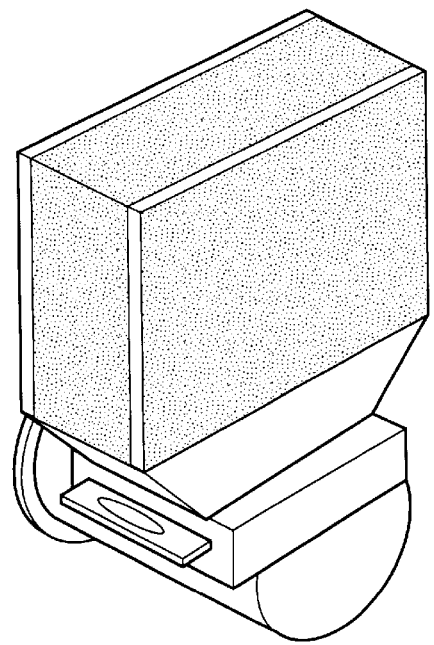

The bi/multi-directional particulate/gas filter cartridge of the present invention may be of any reasonable shape. For example, FIGS. 12A and 12B show views of a cartridge with an octagonal shape. FIGS. 13A and 13B show views of a cartridge with a circular or disk shape. FIGS. 14A and 14B show views of a cartridge with a rectangular shape. The invention is, of course not limited to the illustrated embodiments.

Figure 14C:
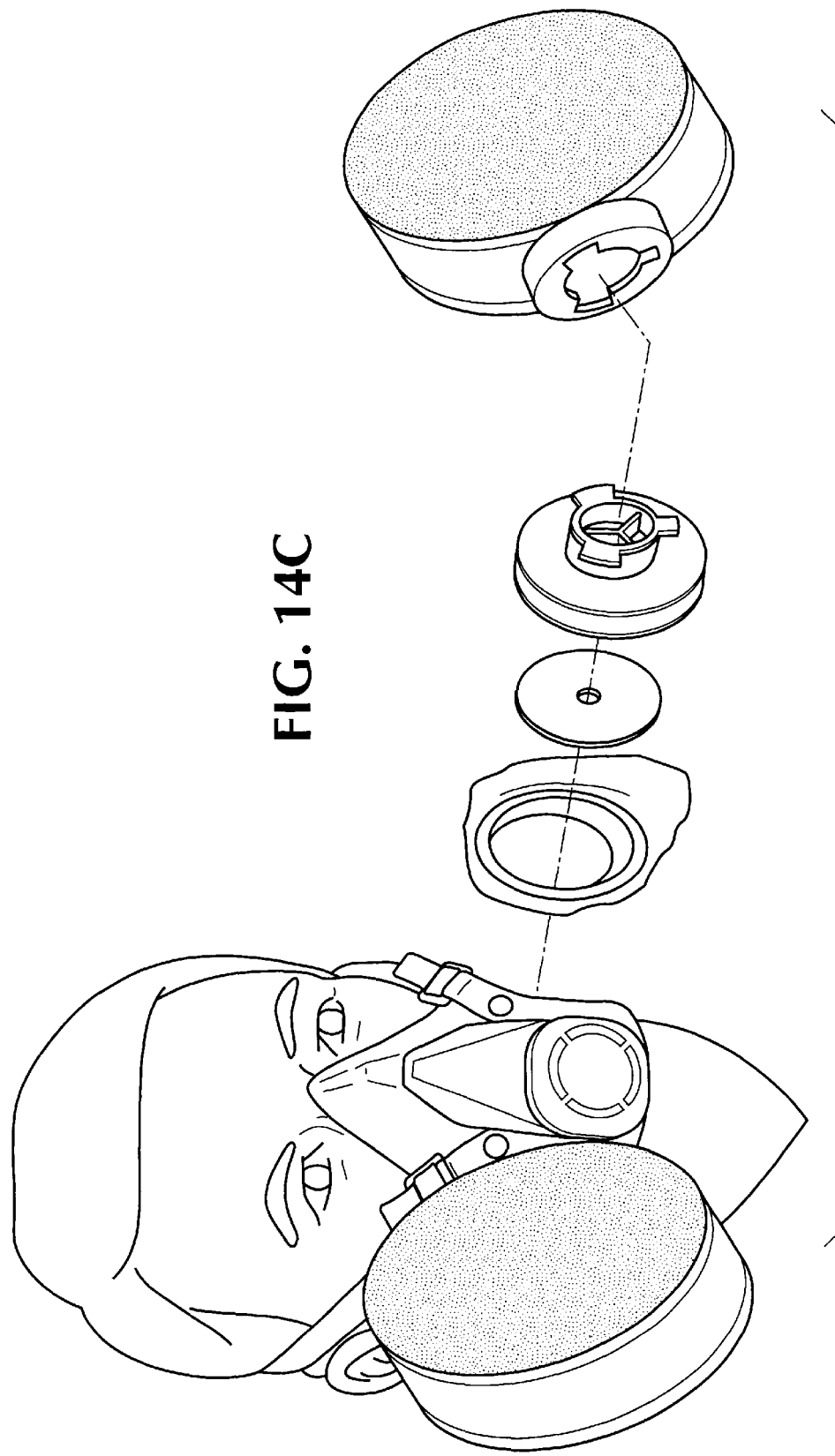
FIG. 14C is a view of a bi/multi-directional filter respirator cartridge in accordance with the present invention that has structure for sealingly engaging the cartridge directly to an input of a respirator.
Figure 15A:
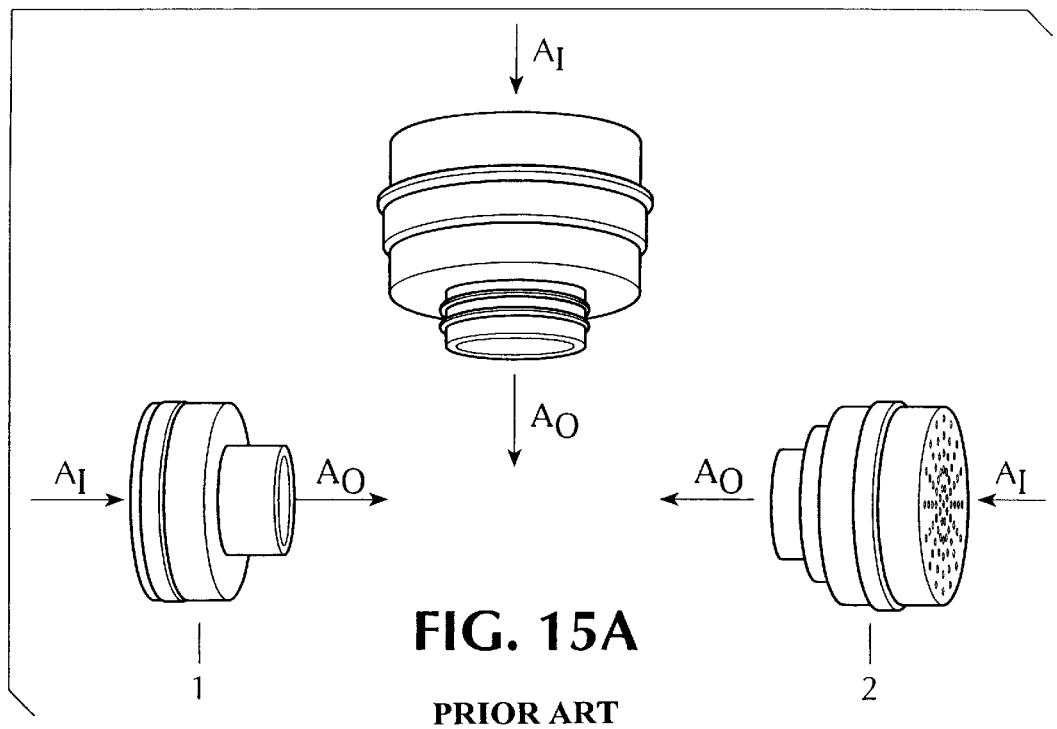
FIGS. 15A–15C are views of conventional unidirectional particulate/gas/vapor filter cartridges.
Figure 15B:
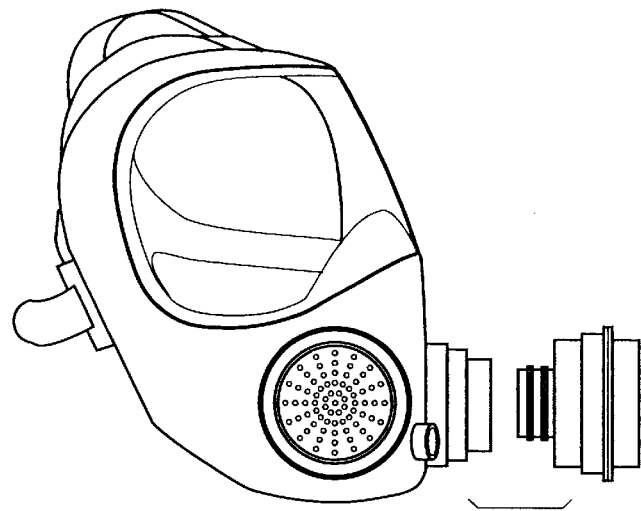
Figure 15C:
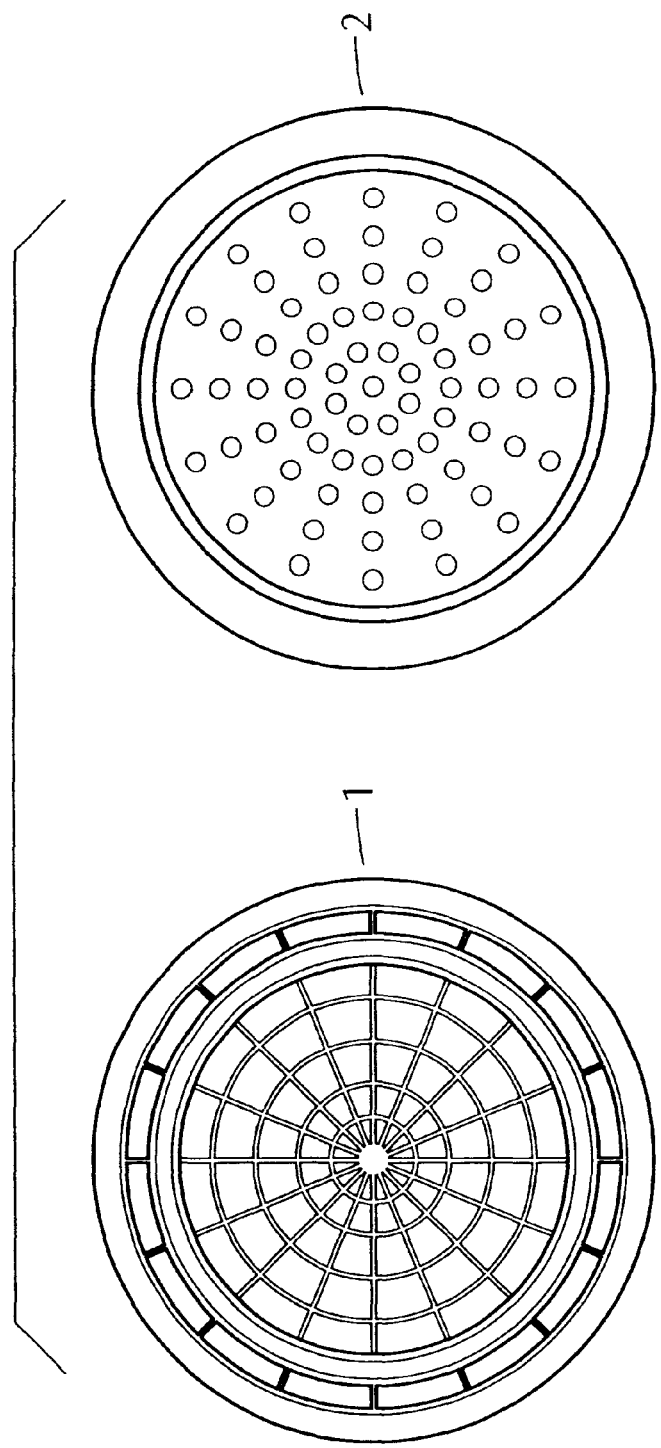

FIG. 14C shows a bi/multi-directional filter respirator cartridge that has structure formed at the opening to allow for direct connection of the cartridge to the respirator without the need for the platform. Specifically, in the illustrated exemplary embodiment, the opening has structure formed therearound that forms a female connector suitable for mating with the illustrated male connector of the respirator. The left side of FIG. 14C shows a cartridge that has been attached to the respirator. The present invention is not limited to the illustrated embodiment. By use of this structure, the input of the respirator can be sealingly engaged with the filter cartridge, without the need for the filter platform.

Since the lung capacity of the wearer is a fixed parameter for all practical purposes, a fixed volume of air is drawn through a relatively large area of filtering material, the effective air speed passing through reduces drastically. Because of this reduced speed, filtration efficiency increases significantly. Hence this invention not only reduces pressure drop and breathing comfort, but also increases the filtration efficiency, and hence the breathing protection, at the same time. Together, these advantages allow users to breathe more comfortably even in situations that would make extended periods of activity impracticable with prior art filters. Importantly, because of the absence of an aperture in the middle of the surface area of each filter disk, and with the capability to employ multiple filter disks and/or cartridges, the present invention can provide markedly increased surface area and improved performance without interfering with a user's vision or mobility. Additionally, with the added ability to ensure bi/multi-directional air flow through the particulate filter material into the adsorbent/absorbent, the present invention takes full advantage of the increased surface area in applications requiring the elimination of gaseous contaminants in air.

Of course, the filter devices described above are merely preferred embodiments of the broader invention disclosed herein. A wide variety of other embodiments are possible, as would be appreciated by those skilled in the art after learning of the present invention.

For example, the filter platform can be integrally formed with the filter or the mask or both, instead of being sealingly engaged, as in the illustrated embodiments.

Although the filters described in the foregoing discussion are generally disk-shaped, they could assume many shapes. In addition, although dual filtration is shown in some embodiments, the present invention provides for the ability to use multiple filter disks and/or cartridges and is not limited to the use of two such elements.

It will be appreciated that filter devices often are used in adverse conditions where the filter material could be cut, torn, or otherwise damaged. In view of this, although it is not shown in the figures, it should be clear that it would be well within the scope of the invention to encase the filter devices in an air-permeable protective casing. For example, the filter devices could be shielded by a perforated plastic or metal shell, individually or collectively. This could be done without in any way changing the bi/multi-directionality of the air flow. For example, a gap can be left between the protective covering and the filtering material, the gap allowing the air to circulate around and enter through the filter material in any accessible direction.

It should be noted that while the invention has been described with respect to certain preferred embodiments, it would be apparent to those skilled in the art that changes and modifications may be made without departing from the scope of the invention. With this in mind, the appended claims define the scope of the invention, which is not limited to the preferred embodiments disclosed herein. These claims should be deemed to include all equivalent constructions insofar as they do not depart from the spirit and scope of the present invention.

What is claimed is:

1. A bi/multi-directional air flow filter cartridge comprising:
   (a) a filter pad including:
      outer filter walls made of a filter material suitable for filtering at least particulates, the filter walls being spaced apart to define an inner area therebetween, and to allow air to pass into the inner area from two or more directions; and
      a gas/vapor adsorber/absorber member, located within the inner area defined by the outer filter walls, the filter walls maintaining a spacing between inner surfaces of the walls and the gas/vapor adsorber/absorber member, wherein the gas/vapor adsorber/absorber member includes an adsorber/absorber upstream portion of its outer surface structured to, in response to a source of suction, receive air that has already been filtered by the filter walls, such that the air passes through at least a minimum length of the gas/vapor adsorber/absorber member and then out of an opening in the filter pad at a downstream portion of the gas/vapor adsorber/absorber member; and
   (b) a filter pad base attached to the filter pad, the base including a connection member located in association with the filter pad opening, wherein the base connects the filter cartridge to a source of suction.

2. A bi/multi-directional air flow filter cartridge according to claim 1, wherein one or more filter cartridges may be connected in series or parallel to the source of suction.

3. A bi/multi-directional air flow filter cartridge according to claim 1, further comprising a filter support member in contact with the filter walls, for maintaining the spacing apart of the filter walls.

4. A bi/multi-directional air flow filter cartridge according to claim 1, further comprising a contaminant ejection member, located in the filter pad base, the ejection member being operable, after connection of the base to the source of suction, to be manipulated to cause ejection of contaminated air trapped between the base and the source of suction during the connection.

5. A bi/multi-directional air filter unit for filtering air to be fed to a respirator through a filter platform comprising an outer housing, the housing forming a chamber within the filter platform, the housing having a first opening at one end of the housing for engaging the platform with a respirator so as to allow air to flow between the chamber and the respirator, and a second opening for engaging the platform with the bi/multi-directional air filter unit so as to allow filtered air to flow into the chamber; a respirator connection member located in association with the first opening, the respirator connection member being structured to connect the first opening to an input of the respirator; and a filter connection member located in association with the second opening, the filter connection member being structured to connect the second opening with the bi/multi-directional filter unit, the bi/multi-directional air filter unit comprising:
   (a) a filter pad including:
      outer filter walls made of a filter material suitable for filtering at least particulates, the filter walls being spaced apart to define an inner area therebetween, and to allow air to pass into the inner area from two or more directions; and
      a gas/vapor adsorber/absorber member, located within the inner area defined by the outer filter walls, the filter walls maintaining a spacing between inner surfaces of the walls and the gas/vapor adsorber/absorber member, wherein the gas/vapor adsorber/absorber member includes an adsorber/absorber upstream portion of its outer surface structured to, in response to a source of suction, receive air that has already been filtered by the filter walls, such that the air passes through at least a minimum length of the gas/vapor adsorber/absorber member and then out of an opening in the filter pad at a downstream portion of the gas/vapor adsorber/absorber member; and
   (b) a platform connection member located in association with the filter pad opening, the platform connection member being structured to sealingly engage the bi/multi-directional air filter unit with the filter connection member of the platform.

6. A filter device comprising:
   (a) bi/multi-directional air filter unit comprising:
      a filter pad including: outer filter walls made of a filter material suitable for filtering at least particulates, the filter walls being spaced apart to define an inner area therebetween, and to allow air to pass into the inner area from two or more directions; and a gas/vapor adsorber/absorber member, located within the inner area defined by the outer filter walls, the filter walls maintaining a spacing between inner surfaces of the walls and the gas/vapor adsorber/absorber member, wherein the gas/vapor adsorber/absorber member includes an adsorber/absorber upstream portion of its outer surface structured to, in response to a source of suction, receive air that has already been filtered by the filter walls, such that the air passes through at least a minimum length of the gas/vapor adsorber/absorber member and then out of an opening in the filter pad at a downstream portion of the gas/vapor adsorber/absorber member; and
      a platform connection member located in association with the filter pad opening; and
   (b) a filter platform comprising:
      a substantially hollow outer housing, the housing forming a chamber within the platform, the housing having a first opening at one end of the housing for engaging the platform with a respirator so as to allow air to flow between the chamber and the respirator, and a second opening for engaging the platform with the bi/multi-directional air filter unit so as to allow filtered air to flow into the chamber;
      a respirator connection member located in association with the first opening, the respirator connection member being structured to connect the first opening to an input of the respirator; and
      a filter connection member located in association with the second opening, the filter connection member being structured to connect the second opening with the bi/multi-directional air filter unit.

7. A filter device according to claim 6, the filter platform having at least one monitoring hole to allow monitoring of the air and/or filter condition.

8. A filter device according to claim 7, wherein the monitoring is done by measuring the pressure of the air within the platform with an air pressure monitoring apparatus.

9. A filter device according to claim 6, further comprising a filter support member in contact with the filter walls, for maintaining the spacing apart of the filter walls.

10. A filter pad for a bi/multi-directional air filter unit, the filter pad comprising: outer filter walls made of a filter material suitable for filtering at least particulates, the filter walls being spaced apart to define an inner area therebetween, and to allow air to pass into the inner area from two or more directions; and a gas/vapor adsorber/absorber member, located within the inner area defined by the outer filter walls, the filter walls maintaining a spacing between inner surfaces of the walls and the gas/vapor adsorber/absorber member, wherein the gas/vapor adsorber/absorber member includes an adsorber/absorber upstream portion of its outer surface structured to, in response to a source of suction, receive air that has already been filtered by the filter walls, such that the air passes through at least a minimum length of the gas/vapor adsorber/absorber member and then out of an opening in the filter pad at a downstream portion of the gas/vapor adsorber/absorber member; and a respirator connection member located in association with the filter pad opening.

11. A filter pad according to claim 10, further comprising a filter support member in contact with the filter walls, for maintaining the spacing apart of the filter walls.

* * * * *